(12) United States Patent
Zhao et al.

(10) Patent No.: US 12,192,992 B2
(45) Date of Patent: Jan. 7, 2025

(54) COMMUNICATION METHOD, DEVICE, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 354 days.

(21) Appl. No.: 17/728,681

(22) Filed: Apr. 25, 2022

(65) Prior Publication Data

US 2022/0248434 A1 Aug. 4, 2022

Related U.S. Application Data

(63) Continuation of application No. PCT/CN2019/116778, filed on Nov. 8, 2019.

(51) Int. Cl.
*H04W 72/1268* (2023.01)
*H04L 1/08* (2006.01)
(Continued)

(52) U.S. Cl.
CPC ........... *H04W 72/1268* (2013.01); *H04L 1/08* (2013.01); *H04L 1/1812* (2013.01); *H04W 72/0446* (2013.01); *H04W 92/18* (2013.01)

(58) Field of Classification Search
CPC ......... H04W 72/1268; H04W 72/0446; H04W 92/18; H04L 1/1812
See application file for complete search history.

(56) References Cited

U.S. PATENT DOCUMENTS

| | | | |
|---|---|---|---|
| 2014/0029532 A1* | 1/2014 | Han | H04W 52/0212 370/329 |
| 2019/0044667 A1 | 2/2019 | Guo et al. | |
| 2021/0329684 A1* | 10/2021 | Yang | H04L 1/1685 |

FOREIGN PATENT DOCUMENTS

| | | |
|---|---|---|
| CN | 103796327 A | 5/2014 |
| CN | 105991247 A | 10/2016 |

(Continued)

OTHER PUBLICATIONS

Huawei ("Discussion on HARQ support for NR sidelink", 3GPP TSG-RAN WG2 #107bis, R2-1913701, Chongqing, China Oct. 14-18, 2019; copy already in file; hereinafter NPL1) (Year: 2019).*
(Continued)

*Primary Examiner* — Michael A Keller
(74) *Attorney, Agent, or Firm* — BAYES PLLC

(57) ABSTRACT

Provided in the present application are a communication method, a device, and a storage medium. The communication method comprises: a terminal device sends a PUCCH to a network device, the PUCCH bearing first information, and the first information being used to indicate the reception conditions of sidelink data sent by the terminal device; the network device determines a target HARQ process number according to the correlation between the PUCCH and the target HARQ process number; and the terminal device re-transmits the sidelink data according to the target HARQ process number.

13 Claims, 4 Drawing Sheets

(51) Int. Cl.
*H04L 1/1812* (2023.01)
*H04W 72/0446* (2023.01)
*H04W 92/18* (2009.01)

(56) References Cited

FOREIGN PATENT DOCUMENTS

| CN | 108604953 A | 9/2018 |
|---|---|---|
| CN | 109217974 A | 1/2019 |
| CN | 109391372 A | 2/2019 |
| CN | 110312315 A | 10/2019 |
| NO | 2017/099860 A1 | 6/2017 |
| WO | WO-2017099860 A1 * | 6/2017 |
| WO | 2018/169937 A1 | 9/2018 |
| WO | 2018194388 A1 | 10/2018 |

OTHER PUBLICATIONS

International Search Report issued in corresponding International Application No. PCT/CN2019/116778, mailed Aug. 11, 2020, 31 pages.
Written Opinion of the International Searching Authority issued in corresponding International Application No. PCT/CN2019/116778, mailed Aug. 11, 2020, 7 pages.
"Sidelink resource allocation mode 1", Agenda Item: 7.2.4.2.1, Source: Huawei, HiSilicon, 3GPP TSG RAN WG1 Meeting #98bis, R1-1910055, Chongqing, China, Oct. 14-20, 2019, 19 pages.
"Discussion on HARQ support for NR sidelink", Agenda Item: 6.4.2, Source: Huawei, HiSilicon, 3GPP TSG-RAN WG2 #107bis, R2-1913701, Chongqing, China, Oct. 14-18, 2019, 17 pages.
"Discussion on mode 1 resource allocation mechanism", Agenda Item: 7.2.4.2.1, Source: vivo, 3GPP TSG RAN WG1 #96bis, R1-1904073, Xi'an, China, Apr. 8-12, 2019, 9 pages.
"Sidelink physical layer procedures for NR V2X", Agenda Item: 7.2.4.1.2, Source: Huawei, HiSilicon, 3GPP TSG RAN WG1 Meeting #95, R1-1812205, Spokane, USA, Nov. 12-16, 2018, 12 pages.
First Office Action issued in corresponding Chinese application No. 202210197808.8, mailed Apr. 5, 2023.
Notice of Reasons for Refusal issued in corresponding Japanese Application No. 2022-524716, mailed on Oct. 13, 2023, 8 pages.
Notification to Grant Patent Right for Invention issued in corresponding Chinese Application No. 2022101978088, mailed on Sep. 28, 2023, 7 pages.
"Enhanced UL transmission with configured grant for URLLC", Agenda Item: 7.2.6.6, Source: NTT Docomo, Inc., 3GPP TSG RAN WG1 #97 R1-1906216, Reno, USA, May 13-17, 2019, 8 pages.
First Office Action issued in corresponding Indian application No. 202217025256, mailed Sep. 22, 2022.
Extended European Search Report issued in corresponding European application No. 19951800.2, mailed Sep. 30, 2022.
Huawei et al., "Correction on UL asynchronous HARQ", R2-164446, 3GPP TSG-RAN WG2 Meeting #94 Nanjing, China, May 23-27, 2016.
Vivo, "Discussion on HARQ operation for NR-U", R1-1904067, 3GPP TSG RAN WG1 Meeting #96bis Xi'an, China, Apr. 8-12, 2019.
Second Office Action issued in corresponding Chinese application No. 202210197808.8, mailed Jul. 1, 2023.
Notice of Allowance issued in corresponding European application No. 19951800.2, mailed Jul. 10, 2023.

* cited by examiner

COMMUNICATION METHOD, DEVICE, AND STORAGE MEDIUM

CROSS REFERENCE TO RELATED APPLICATIONS

This application is a continuation application of International Application No. PCT/CN2019/116778, entitled "COMMUNICATION METHOD, DEVICE, AND STORAGE MEDIUM" filed on Nov. 8, 2019, the contents of which is incorporated herein by reference in its entirety.

TECHNICAL FIELD

Embodiments of the present disclosure relate to the field of communication technologies, and in particular, to a communication method and device, and a storage medium.

BACKGROUND

Device-to-device (D2D) communication is a direct communication manner between devices based on sidelink (SL) transmission technologies, which enables D2D communication systems to have higher spectrum efficiency and lower transmission delay.

For example, Internet of Vehicles (IoV) communication systems adopt D2D transmission technologies to realize direct communications between IoV devices. At present, there are two transmission modes in the IoV communication systems, mode 1, in which a transmission resource used by a terminal device is allocated by a base station, and the terminal device transmits data on the sidelink according to the transmission resource allocated by the base station, that is, a transmission mode based on the network device configuring the transmission resource; and mode 2, in which the terminal device selects the transmission resource from a resource pool for data transmission, that is, a transmission mode based on the terminal device autonomously selecting the transmission resource. In the transmission mode based on the network device configuring the transmission resource, in order to further improve reliability of the communication systems, a feedback mechanism is introduced, that is, when the feedback mechanism is in an active state, a receiving end device can send feedback information to a sending end device according to a condition of receiving the data, the sending end device reports the feedback information to the network device, and then the network device determines whether to allocate a retransmission resource according to the feedback information.

SUMMARY

In a first aspect, the embodiments of the present disclosure can provide a communication method, and the method includes:
  receiving, by a network device, a physical uplink control channel (PUCCH) from a terminal device, wherein the PUCCH carries first information, and the first information is used to indicate reception status of sidelink data sent by the terminal device; and
  determining, by the network device according to the PUCCH, a target HARQ process identification (ID).

In a second aspect, the embodiments of the present disclosure can provide a communication method, and the method includes:
  sending, by a terminal device, a PUCCH to a network device, wherein the PUCCH carries first information, and the first information is used to indicate reception status of sidelink data sent by the terminal device; and
  receiving, by the terminal device, second information sent by the network device, wherein the second information includes a target HARQ process identification (ID) and indication information used to indicate a transmission resource for retransmission of the sidelink data, and
  wherein a target HARQ is determined according to the PUCCH.

In a third aspect, the embodiments of the present disclosure can provide a network device, and the network device includes:
  a transceiving module, configured to receive a PUCCH from a terminal device, wherein the PUCCH carries first information, and the first information is used to indicate reception status of sidelink data sent by the terminal device; and
  a processing module, configured to determine a target HARQ process identification (ID) according to the PUCCH.

In a fourth aspect, the embodiments of the present disclosure can provide a terminal device, and the terminal device includes:
  a transceiving module, configured to send a PUCCH to a network device, wherein the PUCCH carries first information, and the first information is used to indicate reception status of sidelink data sent by the terminal device;
  wherein the transceiving module is further configured to receive second information sent by the network device, the second information includes a target HARQ process identification (ID) and indication information used to indicate a transmission resource for retransmission of the sidelink data, and wherein a target HARQ is determined according to the PUCCH.

In a fifth aspect, the embodiments of the present disclosure can provide a network device, and the network device includes:
  a processor, a memory, and an interface for communication with the network device; wherein:
  the memory stores computer-executable instructions; and
  the processor executes the computer-executable instructions stored in the memory to cause the processor to perform the communication method according to any one of the first aspect above.

In a sixth aspect, the embodiments of the present disclosure can provide a terminal device, and the terminal device includes:
  a processor, a memory, and an interface for communication with the terminal device; wherein:
  the memory stores computer-executable instructions; and
  the processor executes the computer-executable instructions stored in the memory to cause the processor to perform the communication method according to any one of the second aspect above.

In a seventh aspect, the embodiments of the present disclosure can provide a computer-readable storage medium, wherein the computer-readable storage medium stores computer-executable instructions which, when being executed by a processor, are used to implement the communication method according to any one of the first aspect above.

In an eighth aspect, the embodiments of the present disclosure can provide a computer-readable storage medium, wherein the computer-readable storage medium stores computer-executable instructions which, when being executed by a processor, are used to implement the communication method according to any one of the second aspect above.

In a ninth aspect, the embodiments of the present disclosure also provide a program which, when being executed by a processor, is used to perform the communication method according to any one of the first aspect above.

In a tenth aspect, the embodiments of the present disclosure also provide a program which, when being executed by a processor, is used to perform the communication method according to any one of the second aspect above.

In an eleventh aspect, the embodiments of the present disclosure also provide a computer program product including program instructions which are used to implement the communication method according to any one of the first aspect above.

In a twelfth aspect, the embodiments of the present disclosure also provide a computer program product including program instructions which are used to implement the communication method according to any one of the second aspect above.

In a thirteenth aspect, the embodiments of the present disclosure provide a chip, including a processing module and a communication interface, and the processing module can perform the communication method according to any one of the first aspect above.

Further, the chip also includes a storage module such as a memory, the storage module is configured to store instructions, the processing module is configured to execute the instructions stored in the storage module, and the execution of the instructions stored in the storage module causes the processing module to perform the communication method according to any one of the first aspect above.

In a fourteenth aspect, the embodiments of the present disclosure provide a chip, including a processing module and a communication interface, and the processing module can perform the communication method according to any one of the second aspect above.

Further, the chip also includes a storage module such as a memory, the storage module is configured to store instructions, the processing module is configured to execute the instructions stored in the storage module, and the execution of the instructions stored in the storage module causes the processing module to perform the communication method according to any one of the second aspect above.

BRIEF DESCRIPTION OF THE DRAWINGS

To make the technical solutions in the embodiments of the present disclosure or the related art more clear, the accompanying drawings which are referred to in the description of the embodiments or the related art will be briefly described below. Obviously, the drawings in the following description show some embodiments of the present disclosure, and a person of ordinary skill in the art can still derive other drawings from these accompanying drawings without creative efforts.

DETAILED DESCRIPTION

In order to make the purpose, technical solutions and advantages of the embodiments of the present disclosure more clear, the technical solutions in the embodiments of the present disclosure will be described clearly and completely in conjunction with the accompanying drawings in the embodiments of the present disclosure. Obviously, the described embodiments are part of embodiments of the present disclosure, but not all the embodiments. All other embodiments obtained by those of ordinary skill in the art based on the embodiments of the present disclosure without creative work shall fall within the protection scope of the present disclosure.

The terms "first", "second", etc. in the description, claims, and the drawings of the embodiments of the present disclosure are used to distinguish between similar objects, and are not necessarily used to describe a specific sequence or order. It should be understood that the data used in this way can be interchanged under appropriate circumstances, so that the embodiments of the present disclosure described herein can be implemented in a sequence other than those illustrated or described herein, for example.

In addition, the terms "include" and "have" and any variations thereof are intended to cover non-exclusive inclusions.

For example, a process, method, system, product, or device that includes a series of steps or units is not necessarily limited to those steps or units clearly listed, and may include other steps or units that are not clearly listed or are inherent to the process, method, product, or device.

Figure 1:
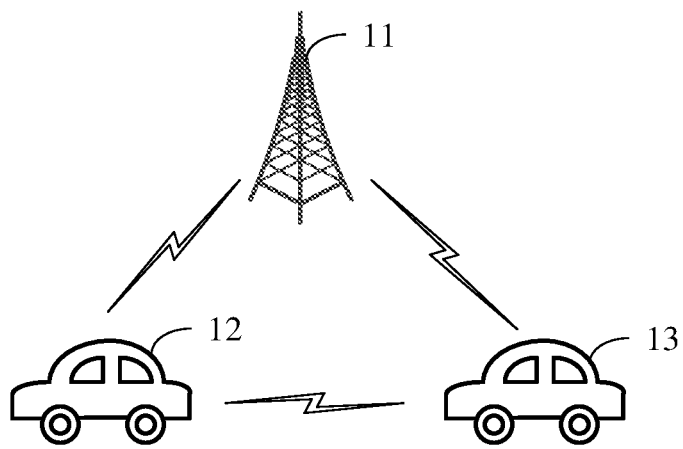
FIG. 1 is a schematic diagram of an application scenario of a communication method according to an embodiment of the present disclosure.

FIG. 1 is a schematic diagram of a communication system to which an embodiment of the present disclosure is applied. As shown in FIG. 1, the communication system includes at least a network device 11 and a terminal device. The terminal device includes a first terminal device 12 and a second terminal device 13. It should be understood that in an actual communication system, there may be multiple network devices 11 and multiple terminal devices 12. The situation shown in FIG. 2 is only an example.

Figure 2:
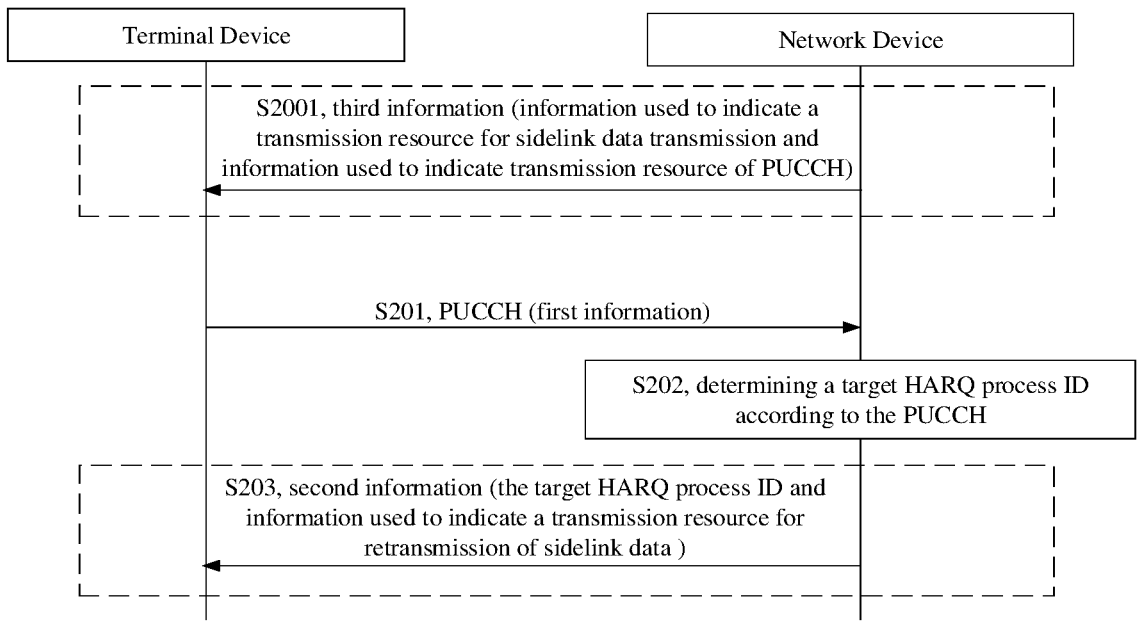
FIG. 2 is a flowchart of a first embodiment of a communication method according to the present disclosure.

In the communication system shown in FIG. 2, data transmission between the first terminal device 12 and the second terminal device 13 can be carried out through D2D communication technologies. Sidelink transmission resources used by multiple terminal devices for D2D communication are allocated by the network device, that is to say, the communication system shown in FIG. 1 adopts a transmission method based on the network device configuring the sidelink transmission resource. The network device allocating the sidelink transmission resource for the terminal device can include allocating the resource for a single transmission, or allocating the resource for semi-persistent transmission.

In the actual communication system, a transmission method based on the terminal device autonomously selecting the sidelink transmission resource can also be used between the terminal devices.

In the transmission method based on the network configuring the sidelink transmission resource, the sidelink transmission resource is allocated by the network. Further, in order to improve the reliability of the communication system, a feedback mechanism is introduced, and the feedback mechanism is specifically a sidelink feedback mechanism.

For example, the first terminal device 12 is a sending end device, and the second terminal device 13 is a receiving end device. The first terminal device 12 sends data to the second terminal device 13 through the sidelink transmission resource configured by the network device, and the second terminal device 13 sends feedback information to the first terminal device 12 according to reception status of the data. The feedback information can be an acknowledgement (ACK) or a negative acknowledgement (NACK), where the ACK indicates that the second terminal device successfully receives the data, and the NACK indicates that the second terminal device has not successfully received the data. The first terminal device receives the feedback information sent by the second terminal device, the first terminal device reports the feedback information to the network device, and the network device determines whether to allocate the retransmission resource according to the sidelink feedback information reported by the first terminal device. In the transmission mode based on the network configuring the sidelink transmission resource, the transmission resources used by the terminal for reporting the sidelink feedback information to the network, that is, an uplink transmission resource, is also allocated by the network device.

For example, the network device allocates a PUCCH transmission resource to the terminal device. If the terminal device needs to send reporting feedback information to the network device, the terminal device can send a PUCCH to the network through the PUCCH transmission resource, and the PUCCH carries the sidelink feedback information.

In the actual communication system, the sending end device can determine whether it needs to receive the feedback information sent by the receiving end device.

For example, for a broadcast communication, there may be no need to receive the feedback information; and for a unicast communication, the sending end device needs to receive the feedback information so as to improve the reliability of the system.

For example, the sending end device may have indication information to be carried in sidelink control information (SCI) to indicate to the receiving end whether to perform the sidelink feedback.

In the actual communication system, in addition to using the sidelink transmission resources configured by the network device for the transmission between terminal devices, the terminal device can autonomously select the sidelink transmission resource for transmission from the resource pool, that is to say, the terminal device can also use perform the sidelink transmission using the transmission resource autonomously selected by the terminal device. If the terminal device performs multiple sidelink transmissions at the same time, the respective sidelink transmission resources corresponding to the multiple sidelink transmissions can be configured grant sidelink transmission resources by the network device, or the sidelink transmission resources autonomously selected by the terminal device.

When the network device allocates the retransmission resource, it needs to determine a HARQ process ID used for a sidelink transmission of data that needs to be retransmitted between the first terminal device and the second terminal device, and the HARQ process ID used for the sidelink transmission of the retransmission is the same as the HARQ process ID for an initial transmission. However, since the network device cannot determine the HARQ process ID used for the sidelink transmission in the transmission mode based on the autonomously selected the sidelink transmission resource by the terminal device, it is difficult for the network device to determine the HARQ process ID used for the sidelink transmission of data that needs to be retransmitted between the first terminal device and the second terminal device.

When the terminal device uses the above two modes for D2D communication, each sidelink transmission corresponds to a hybrid automatic repeat request (HARQ) process identification (ID). If the terminal device is operating in the above mode 1 and mode 2 at the same time, it is difficult for the network device to determine the HARQ process ID corresponding to the sidelink transmission when allocating the retransmission resource.

The embodiments of the present disclosure provide a communication method to solve the above-mentioned problems. The communication method provided by the present disclosure will be described in detail below through several specific embodiments.

FIG. 2 is a flowchart of a first embodiment of a communication method according to the present disclosure. As shown in FIG. 2, the method in this embodiment includes the following.

In S201, a terminal device sends a PUCCH to a network device.

Correspondingly, the network device receives the PUCCH sent by the terminal device. The PUCCH carries first information, and the first information is used to indicate reception status of sidelink data sent by the terminal device.

In this step, a PUCCH transmission resource used by the terminal device for sending the PUCCH to the network device is a PUCCH transmission resource configured by the network device. Exemplarily, the terminal device may be the first terminal device in the communication system shown in FIG. 1, and the first information may be sidelink feedback information. For example, the first information may be a sidelink HARQ ACK or NACK.

In S202, the network device determines a target HARQ process ID according to the PUCCH.

In this scheme, the target HARQ process ID is associated with the PUCCH, and the network device can determine the target HARQ process ID according to the PUCCH.

In this step, the network device may determine the target HARQ process ID according to a preset correspondence between transmission resources of multiple PUCCHs and HARQ process IDs, and the PUCCH received by the network device. The preset transmission resources of the multiple PUCCHs may be PUCCH transmission resources corresponding to one or more transmission resources for sidelink transmission allocated by the network device to the terminal device, that is, the network device may allocate one or more transmission resources for sidelink transmission to the terminal device, each transmission resource for sidelink transmission corresponds to one or more PUCCH transmission resources, and each PUCCH transmission resource corresponds to a HARQ process ID supported by the terminal device. Therefore, there is a correspondence between the PUCCH transmission resources and the HARQ process IDs, and according to the received PUCCH and the correspondence, the network device can determine the HARQ process ID corresponding to the PUCCH. The preset correspondence between the transmission resources of the multiple PUCCHs and the HARQ process IDs can be determined explicitly or implicitly.

In this embodiment, the terminal device sends the PUCCH to the network device, and the network device determines the target HARQ process ID according to the correlation between the PUCCH and the target HARQ process ID. When the network needs to allocate a retransmission resource for the terminal, it has the HARQ process ID to be carried in retransmission scheduling information.

Optionally, in some embodiments, after the network device determines the target HARQ process ID according to the PUCCH in the S202, the method further includes:

in S203, the network device sends second information to the terminal device.

Correspondingly, the terminal device receives the second information sent by the network device, and the second information includes the target HARQ process ID and information used to indicate a transmission resource for retransmission of the sidelink data.

In this scheme, when the network device determines according to the first information that it needs to allocate the retransmission resource to the terminal device, it configures the transmission resource for the sidelink data retransmission for the terminal device, and generates the second information. The second information includes the target HARQ process ID determined in the S202 and the indication information used to indicate the transmission resource for the retransmission of the sidelink data.

After receiving the second information, the terminal device can configure the retransmission resource according to the indication information of the transmission resource for the sidelink data retransmission indicated in the second information, determine the HARQ process ID used for retransmission of the sidelink data according to the target HARQ process ID, and retransmits data buffered in the process.

In this embodiment, the network device sends the second information to the terminal device, and the terminal device retransmits the sidelink data according to the target HARQ process ID.

Optionally, in some embodiments, before the terminal device sends the PUCCH to the network device in the S201, the method further includes:

in S2001, the network device sends third information to the terminal device.

Correspondingly, the terminal device receives the third information sent by the network device, and the third information includes information used to indicate a transmission resource for the sidelink data transmission and information used to indicate a PUCCH transmission resource.

In this step, the transmission mode based on the network device configuring the transmission resource is used for the D2D communication between terminal devices, and before the terminal device performs the communication, the network device needs to configure the terminal device with the transmission resource for sidelink transmission, and the terminal device transmits the sidelink data on the sidelink transmission resource configured by the network device. The network device can configure a sidelink configured grant transmission resource for the terminal device, the sidelink configured grant transmission resource is a periodic transmission resource, and the network device can allocate one or more transmission resources for the sidelink data transmission to the terminal device within a transmission period of the sidelink configured grant. The multiple transmission resources for the sidelink data transmission may use different time domain resources, frequency domain resources, or code domain resources within one transmission period of the sidelink configured grant.

Figure 3:
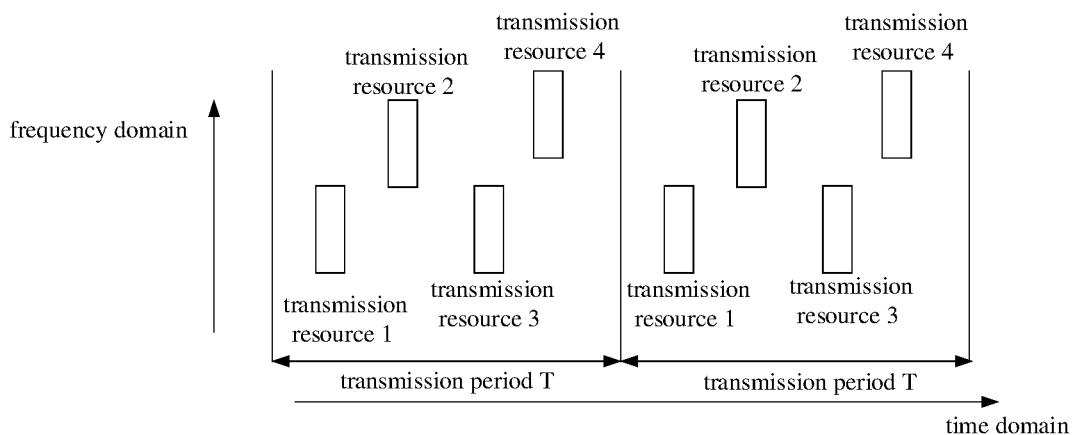
FIG. 3 is a schematic structural diagram of a periodic transmission resource according to the present disclosure.

For example, referring to FIG. 3, the network device allocates the sidelink configured grant transmission resource to the terminal. Each transmission period T includes four transmission resources for the sidelink data transmission, and these four transmission resources for the sidelink data transmission respectively use different slots. Frequency domain resources of the four sidelink transmission resources have the same size, and frequency domain starting positions of the four sidelink transmission resources can be the same or different.

Optionally, in the sidelink configured grant, the network device also needs to configure the terminal device with an uplink transmission resource used to send the sidelink feedback information to the network, that is, the PUCCH transmission resource. The PUCCH transmission resource may include a PUCCH time domain resource, a PUCCH frequency domain resource and/or a PUCCH code domain resource.

In some possible implementations, the network device also needs to configure transmission parameters for the sidelink transmission and uplink transmission for the terminal device, and the network device can send the respective transmission parameters corresponding to the sidelink transmission and the uplink transmission to the terminal device. The network device may send the respective transmission parameters corresponding to the sidelink transmission and the uplink transmission and the third information through the same signaling, or through different signaling. The terminal device performs the sidelink data transmission according to the sidelink transmission resource configured by the network device and the transmission parameters corresponding to the sidelink transmission resource; and the terminal device also performs the uplink transmission according to the uplink transmission resource configured by the network device and the transmission parameters corresponding to the uplink transmission resource, that is, the terminal device sends the sidelink feedback information to the network device according to the PUCCH transmission resource configured by the network device and the transmission parameters corresponding to the PUCCH transmission resource.

In a possible implementation, the network device sends RRC signaling to the terminal device, and the RRC signaling includes the third information. In the actual communication system, the network device can configure the transmission resource used by the terminal device for the sidelink data transmission, the uplink transmission resource used by the terminal device for transmission of the feedback information, the transmission parameters corresponding to the transmission resource used by the terminal device for the sidelink data transmission and the transmission parameters corresponding to the uplink transmission resources used by the terminal device for the transmission of the feedback information all at once through the RRC signaling.

Exemplarily, the network device sends radio resource control (RRC) signaling to the terminal device, and the network device configures the transmission resource used by the terminal device for the sidelink data transmission and the uplink transmission resource used by the terminal device for the transmission of the sidelink feedback information through the RRC signaling. The network device may also configure the transmission parameters corresponding to the transmission resource used by the terminal device for the sidelink data transmission and the transmission parameters corresponding to the uplink transmission resources used by the terminal device for the transmission of the sidelink feedback information through the RRC signaling at the same time. According to the received RRC signaling, the terminal device can use the transmission resource and the transmission parameters configured in the RRC signaling to transmit the sidelink data and the uplink data.

For example, the RRC signaling includes all transmission resources and transmission parameters including time domain resources, frequency domain resources, demodulation reference signal (DMRS) information, modulation and coding scheme (MC S), redundancy versions (RVs), the number of repetitions, the number of HARQ processes, etc.

In another possible implementation, the network device sends downlink control information (DCI) to the terminal device, and the DCI includes the third information. In the actual communication system, the network device can also configure the transmission resource used by the terminal device for the sidelink data transmission, the uplink transmission resource used by the terminal device for the transmission of the sidelink feedback information, the transmission parameters corresponding to the transmission resource used by the terminal device for the sidelink data transmission and the transmission parameters corresponding to the uplink transmission resources used by the terminal device for the transmission of the sidelink feedback information through different signaling. That is, the network device first configures part of the transmission resources and transmission parameters, and then sends the DCI to the terminal device, and the terminal device activates and configures other transmission resources and transmission parameters after receiving the DCI.

Exemplarily, the network device sends the DCI to the terminal device, and the network device configures the transmission resource used by the terminal device for the sidelink data transmission and the uplink transmission resource (that is, the PUCCH transmission resource) used by the terminal device for the transmission of the sidelink feedback information. The terminal device receives the DCI, and then activates and configures the transmission resource for the sidelink data transmission and the uplink transmission resource for the transmission of the sidelink feedback information, and thereafter, the terminal device can perform the sidelink data transmission and the uplink data transmission using the transmission resources configured in the DCI. Before the network device sends the DCI to the terminal device, the network device may first send other transmission parameters for the sidelink data transmission and the uplink data transmission to the terminal device.

In the communication system, the network device allocates the transmission resource for the sidelink data transmission and the PUCCH transmission resource for the sidelink feedback information reception to the terminal devices, and can determine the target HARQ process ID according to the preset correspondence between the multiple PUCCH transmission resources and the HARQ process IDs, and the third information includes information used to indicate the transmission resource for the sidelink data transmission and information used to indicate the PUCCH transmission resource for the sidelink feedback information reception.

Alternatively, the network device may also allocate the HARQ process ID to the terminal device. Therefore, in addition to the information used to indicate the transmission resource for the sidelink data transmission and the information used to indicate the PUCCH transmission resource for sending the sidelink feedback information, the third information further includes the target HARQ process ID.

In this embodiment, the network device allocates the transmission resource for the sidelink data transmission and the PUCCH transmission resource for sending the sidelink feedback information to the terminal device, and there is no need for the terminal device to request the transmission resources from the network device when the terminal device needs to perform the sidelink data transmission and send the sidelink feedback information, thereby reducing data transmission delay and improving efficiency of the communication system.

Figure 4:
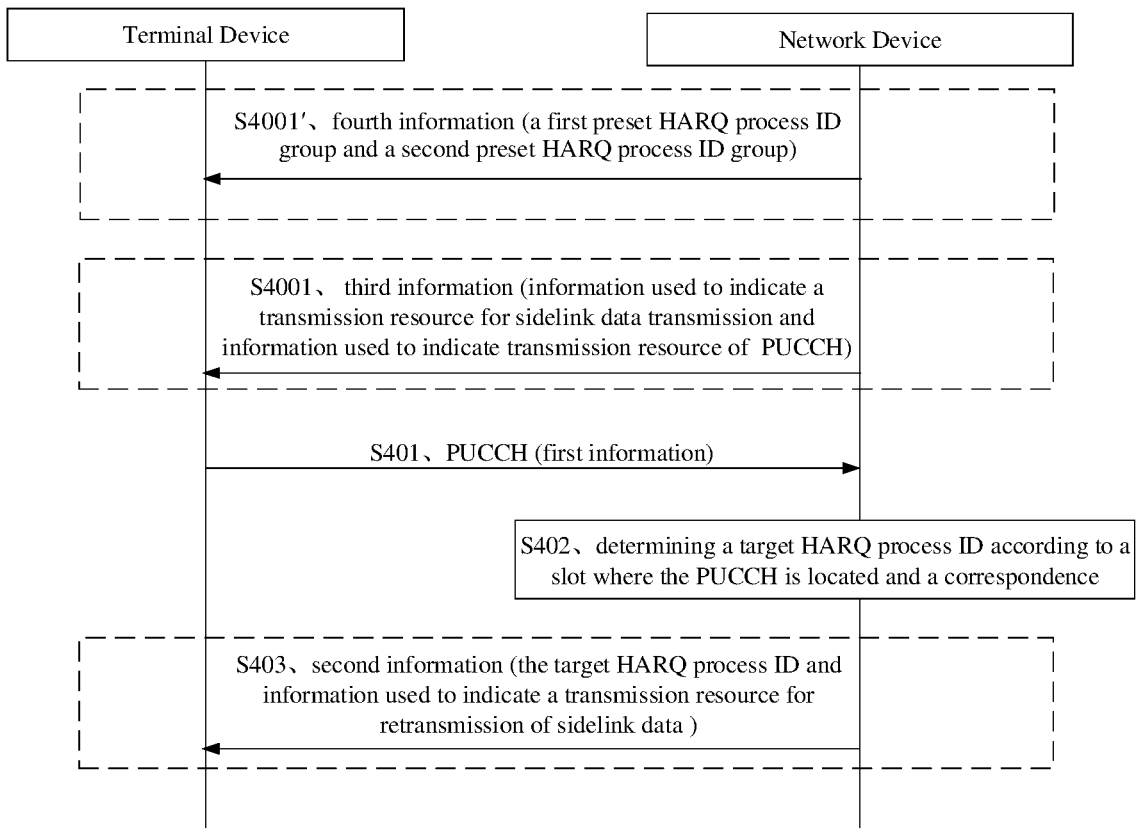
FIG. 4 is a flowchart of a second embodiment of a communication method according to the present disclosure.

FIG. 4 is a flowchart of a second embodiment of a communication method according to the present disclosure. As shown in FIG. 4, the method in this embodiment includes:

in S4001, the network device sends third information to the terminal device.

In this step, the third information sent by the network device to the terminal device includes information used to indicate the transmission resource for the sidelink data transmission and the information used to indicate the PUCCH transmission resource for receiving the feedback information.

In this scheme, all HARQ process IDs supported by the terminal device are divided into a first HARQ process ID group and a second HARQ process ID group, where the first HARQ process ID group includes HARQ process IDs used in performing the sidelink data transmission based on the configured grant transmission resource, that is, the first HARQ process ID group includes the HARQ process IDs of the sidelink configured grant by the network device, and the first HARQ process ID group may include one or more HARQ process IDs. The second HARQ process ID group includes HARQ process IDs used in performing the sidelink data transmission based on the transmission resource autonomously selected by the terminal, and the second HARQ process ID group may include one or more HARQ process IDs.

In the actual communication system, when the network device configures the sidelink transmission resource for the terminal device, the preset correspondence between the transmission resources of the multiple PUCCHs and the HARQ process IDs can be implicitly determined. That is to say, when the network device configures the sidelink configured grant transmission resource (including the sidelink transmission resource and the PUCCH transmission resource for receiving the feedback information) for the terminal device, the correspondence between the PUCCH transmission resource and the target HARQ process ID is established, and the correspondence can be implicitly determined.

For example, based on the sidelink configured grant transmission resource configured by the network device, the number of the HARQ process IDs supported by the terminal device is four, that is, the first preset HARQ process ID group includes four HARQ process IDs, and the four HARQ process IDs are HARQ0, HARQ1, HARQ2, and HARQ3. In configuring the transmission resources, the transmission resources can be allocated cyclically for the four HARQ process IDs in a preset manner.

In this step, the network device sends the third information to the terminal device through the RRC signaling and/or the DCI.

In S401, the terminal device sends the PUCCH to the network device. Correspondingly, the network device receives the PUCCH sent by the terminal device.

The S401 in this embodiment is similar to the S201 in the embodiment shown in FIG. 2 and will not be repeated here. For details, reference may be made to the detailed description of the S201 in the embodiment shown in FIG. 2.

In S402, the network device determines the target HARQ process ID according to a slot where the PUCCH is located and a correspondence.

The correspondence in the S402 is a preset correspondence between slots where the multiple PUCCHs are located and the HARQ process IDs in the first preset HARQ process ID group. In some possible designs, the preset correspondence between the multiple PUCCH transmission resources and the HARQ process IDs includes the preset correspondence between the slots where the multiple PUCCHs are located and the HARQ process IDs in the first preset HARQ process ID group, and the first preset HARQ process ID group includes the HARQ process ID for the sidelink data transmission based on configured grant transmission resource.

In some possible designs, the first preset HARQ process ID group includes K HARQ process ID sub-groups, and each HARQ process ID sub-group includes one or more HARQ process IDs; and the K HARQ process ID sub-groups respectively correspond to K sidelink configured grant groups, and each sidelink configured grant group of transmission resources includes one or more transmission resources for the sidelink data transmission, where K is greater than or equal to 1. K can be a positive integer greater than or equal to 1.

For example, the network device allocates the sidelink configured grant transmission resource for the terminal device, the configured grant transmission resource is a periodic transmission resource, and in each transmission period there are one or more transmission resources for the sidelink data transmission (the transmission resource for the sidelink data transmission is referred to as the sidelink transmission resource hereinafter for short). If the sidelink feedback is activated, in each transmission period there are one or more uplink transmission resources, such as the PUCCH transmission resources, and the uplink transmission resource is used by the sending end to report the sidelink feedback information to the network side.

For example, referring to FIG. 3, in each transmission period there are four sidelink transmission resources and one PUCCH transmission resource, and the PUCCH transmission resource is located after the sidelink feedback resources corresponding to the four sidelink transmission resources, so that the sending end can determine the sidelink feedback information to be reported to the network based on all the received sidelink feedback information. The same HARQ process ID is used for the sidelink data transmitted on the four sidelink transmission resources in each transmission period. Therefore, the PUCCH transmission resources in the transmission period may have a correspondence with the HARQ process ID. Different HARQ process IDs may be used for the sidelink transmission resources in different transmission periods, that is, the PUCCH transmission resources in different transmission periods correspond to different HARQ process IDs.

In addition, the time domain resources of the PUCCH transmission resources in different transmission periods are different. Therefore, the network can determine the HARQ process ID corresponding to the PUCCH according to the time domain resource of the received PUCCH.

For example, the maximum number of HARQ processes supported by the terminal is 16, and the HARQ process IDs allocated by the network for the configured grant, that is, the first HARQ process ID group, include four HARQ process IDs, which are HARQ0, HARQ1, HARQ2, and HARQ3, respectively. In each transmission period of the sidelink transmission resources configured by the network device for the terminal device, there are four sidelink transmission resources and one PUCCH transmission resource, and thus the PUCCH time domain resources in different transmission periods are different. There is an implicit correspondence between the PUCCH transmission resources in different transmission periods and the HARQ process IDs.

For example, the PUCCH transmission resources in a first transmission period correspond to HARQ0, the PUCCH transmission resources in a second transmission period correspond to HARQ1, the PUCCH transmission resources in a third transmission period correspond to HARQ2, and the PUCCH transmission resources in a fourth transmission period correspond to HARQ3. Since all HARQ process IDs have been used, the PUCCHs in the subsequent transmission periods can correspond to the HARQ process IDs in a circular manner.

For example, the PUCCH transmission resources in a fifth transmission period correspond to HARQ0, the PUCCH transmission resources in a sixth transmission period correspond to HARQ1, and so on. The network device receives the PUCCH sent by the terminal device, and can determine the HARQ process ID according to the period where the PUCCH is located and the above-mentioned correspondence. If the sidelink feedback information carried in the PUCCH is NACK, the network allocates the retransmission resource for the terminal in a dynamic scheduling manner, the HARQ process ID and the retransmission resource information are included in retransmission scheduling information (the retransmission resource information indicates a transmission resource for retransmission of the sidelink data), and the sending end receives the retransmission scheduling information, and can determine the sidelink transmission in which period the retransmission scheduling is used for and retransmit the sidelink data corresponding to the HARQ process ID on the retransmission resource.

Optionally, in an embodiment, the network device allocates a first group of HARQ process IDs for the transmission resources based on the configured grant, and allocates a second group of HARQ process IDs for the transmission resources autonomously selected by the terminal. Specifically, in the transmission resources based on the configured grant, the network device determines the HARQ process ID corresponding to the PUCCH in the first group of HARQ process IDs according to the PUCCH transmission resource based on the above embodiments, which will not be repeated here.

Optionally, in an embodiment, the network device configures multiple sets of configured grant transmission resources (i.e., multiple groups of transmission resources based on configured grant) for the terminal device, and allocates a group of HARQ process IDs for each set of configured grant transmission resources.

For example, the network device configures two sets of configured grant transmission resources for the terminal device, and allocates the first group of HARQ process IDs (i.e., the first HARQ process ID subgroup) for the first set of configured grant transmission resources, and configures the second group of HARQ process IDs (i.e., the second HARQ process ID subgroup) for the second set of configured grant transmission resources. Specifically, in each set of configured grant transmission resources, the network device determines the HARQ process ID in the group of HARQ process IDs corresponding to the set of the configured grant transmission resources according to the PUCCH transmission resource based on the above embodiments, which will not be repeated here.

For example, the network device configures four sets of sidelink configured grants transmission resources for the terminal device, and the maximum number of HARQ processes that the terminal device can support are divided into four groups, and the HARQ process IDs included in each group are for example: HARQ0-HARQ3 in a first group; HARQ4-HARQ7 in a second group; HARQ8-HARQ11 in a third group; and HARQ12-HARQ15 in a fourth group. These four HARQ process ID groups correspond to the four sets of sidelink configured grants, respectively. In each set of sidelink configured grants, the HARQ process ID in the group of HARQ process IDs corresponding to the set of sidelink configured grants is determined based on the PUCCH transmission resource as described in the above embodiments, which will not be repeated here.

Optionally, in an embodiment, the network device configures multiple sets of configured grant transmission resources for the terminal device, and configures a unified group of HARQ process IDs for all configured grant transmission resources. The network determines the corresponding HARQ process IDs according to the PUCCH transmission resources of the multiple sets of configured grant.

For example, the network device configures two sets of configured grant transmission resources for the sending end, and in a first set of configured grant resources, in each transmission period, there are two sidelink transmission resources and one PUCCH transmission resource; in a second set of sidelink configured grants resources, in each transmission period, there are four sidelink transmission resources and one PUCCH transmission resource. A group of HARQ process IDs allocated by the network device for the configured grant resources includes four processes, which are HARQ0-HARQ3, respectively. The PUCCH transmission resources configured by the network device for the two sets of configured grant resources occupy different slots in the time domain, and accordingly, the network device can determine the HARQ process ID corresponding to the PUCCH transmission resource according to the time domain resource of the received PUCCH.

For example, assuming that the transmission period configured by the network device for the first set of configured grant is 100 slots, and the PUCCH transmission resource is located in the 60th slot in the transmission period; the transmission period configured by the network device for the second set of configured grant is 100 slots, and the PUCCH transmission resource is located in the 70th slot in the transmission period, the transmission resource of a first PUCCH received by the network device (for example, in slot 60) is a PUCCH transmission resource in the first transmission period of the first set of configured grant, and the HARQ process ID thereof is HARQ0; the transmission resource of a second PUCCH received by the network device (for example, in slot 70) is a PUCCH transmission resource in the first transmission period of the second set of configured grant, and the HARQ process ID thereof is HARQ1; the transmission resource of a third PUCCH received by the network device(for example, in slot 160) is a PUCCH transmission resource in the second transmission period of the first set of configured grant, and the HARQ process ID thereof is HARQ2; the transmission resource of a fourth PUCCH received by the network device (for example, in slot 170) is a PUCCH transmission resource in the second transmission period of the second set of configured grant, and the HARQ process ID thereof is HARQ0; the transmission resource of a fifth PUCCH received by the network device (for example, in slot 260) is a PUCCH transmission resource in the third transmission period of the first set of configured grant, and the HARQ process ID is HARQ0; and the transmission resource of a sixth PUCCH received by the network device (for example, in slot 270) is a PUCCH transmission resource of the third transmission period of the second set of configured grant, and the HARQ process ID thereof is HARQ1; and so on.

In S403, the network device sends second information to the terminal device.

S402 in this embodiment is similar to S202 in the embodiment shown in FIG. 2 and will not be repeated here. For details, reference may be made to the detailed description of S202 in the embodiment shown in FIG. 2.

Optionally, before the network device sends the third information to the terminal device in S4001, the method further includes:

in S4001', the network device sends fourth information to the terminal device. Correspondingly, the terminal device receives the fourth information sent by the network device.

The fourth information includes the first preset HARQ process ID group and the second preset HARQ process ID group.

For example, the HARQ process IDs supported by the terminal device are 0, 1, 2 . . . 15, respectively, and the HARQ process IDs included in the first preset HARQ process ID group included in the fourth information are 0, 1, 2, 3, 4, 5, 6, 7, respectively. The HARQ process IDs included in the second preset HARQ process ID group are 8, 9, 10, 11, 12, 13, 14, and 15 respectively. The network device sends the fourth information to the terminal device, and the terminal device can determine the transmission mode of the sidelink transmission corresponding to each HARQ process ID according to the fourth information.

In some possible implementations, if the first preset HARQ process ID group includes K HARQ process ID subgroups, the fourth information further includes information of the K HARQ process ID subgroups included in the first preset HARQ process ID group.

In this embodiment, the network device sends the fourth information to the terminal device, thereby dividing the HARQ process IDs supported by the terminal device into the first preset HARQ process ID group and the second preset HARQ process ID group. The first preset HARQ process ID group and the second preset HARQ process ID group respectively support different transmission modes, and when the network device configures the transmission resource for the terminal device, it can select the HARQ process ID from the first HARQ process ID group. Thereafter, when the network device allocates the retransmission resource to the terminal device, it can determine the target HARQ process ID according to the selected HARQ process ID. When the network needs to allocate the retransmission resource for the terminal, the HARQ process ID is carried in the retransmission scheduling information, so that the terminal can retransmit the sidelink data according to the target HARQ process ID.

Figure 5:
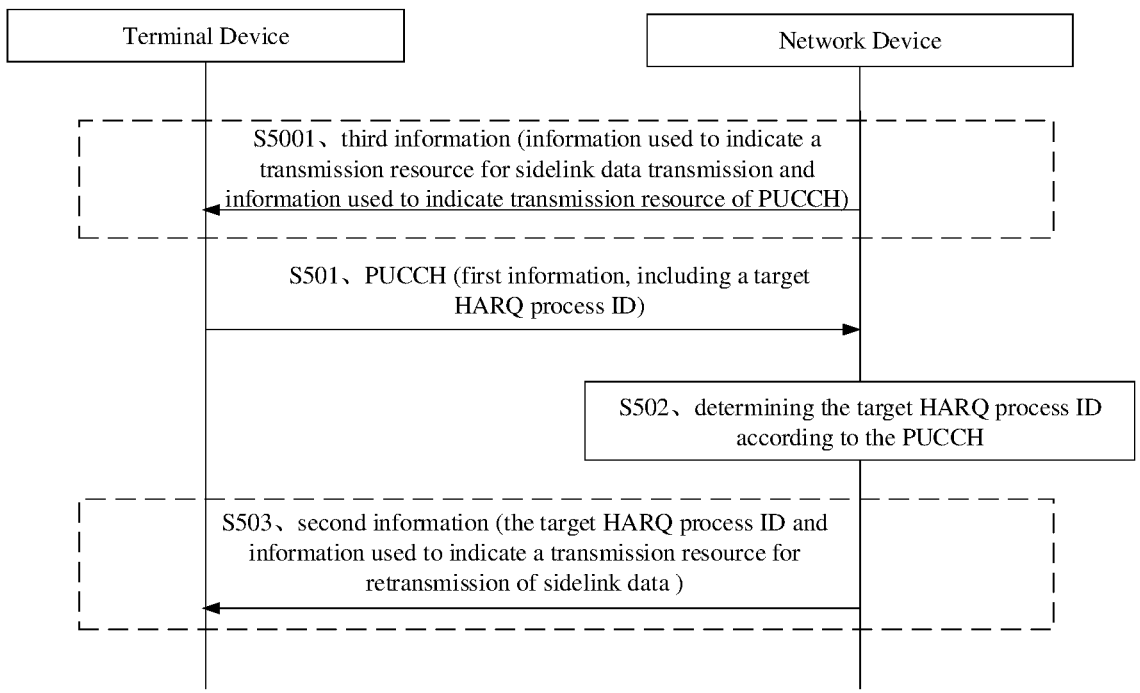
FIG. 5 is a flowchart of a third embodiment of a communication method according to the present disclosure.

FIG. 5 is a flowchart of a third embodiment of a communication method according to the present disclosure. As shown in FIG. 5, the method in this embodiment includes:

in S5001, the network device sends third information to the terminal device.

In this embodiment, the third information sent by the network device to the terminal device includes information used to indicate the transmission resource for the sidelink data transmission and information used to indicate the PUCCH transmission resource for receiving the feedback information.

For example, the third information sent by the network device includes the information used to indicate the transmission resource for the sidelink data transmission and the information used to indicate one or more pre-configured PUCCH transmission resources.

In S501, the terminal device sends the PUCCH to the network device. Correspondingly, the network device receives the PUCCH sent by the terminal device. The first information carried in the PUCCH includes the target HARQ process ID.

In S502, the network device determines the target HARQ process ID according to the PUCCH.

That is, in this scheme, the terminal device actively reports the target HARQ process ID to the network device.

In a possible implementation, the target HARQ process ID can be transmitted through a PUCCH code domain resource. That is, the terminal device reports the reception status of the sidelink data to the network device through PUCCH format 0, and the terminal device can perform encoding according to the target HARQ process ID and the information regarding the reception status of the sidelink data sent by the terminal device, and generate an information sequence, i.e., the first information. After receiving the PUCCH from the terminal device, the network device detects the received PUCCH according to the HARQ process IDs supported by the terminal device to obtain the target HARQ process ID carried in the PUCCH and the reception status of the sidelink data sent by the terminal device.

In this implementation, the target HARQ process ID is carried by the PUCCH code domain resource, and the network device can determine the HARQ process ID reported by the terminal device as the target HARQ process ID.

In another possible implementation, the terminal device can also select the PUCCH transmission resource corresponding to the HARQ process ID among the one or more PUCCH transmission resources configured by the network device according to the target HARQ process ID, and sends the first information to the network device based on the selected PUCCH resource. There is a one-to-one correspondence between the one or more PUCCH transmission resources pre-configured by the network device and the HARQ process IDs, and the network device can accurately determine the target HARQ process ID according to the one-to-one correspondence between the pre-configured one or more PUCCH transmission resources and the HARQ process IDs, and the received PUCCH.

In the actual communication system, the network device and the terminal device can negotiate to determine in which way the terminal device reports the target HARQ process ID.

In S503, the network device sends the second information to the terminal device.

S503 in this embodiment is similar to S202 in the embodiment shown in FIG. 2 and will not be repeated here. For details, reference may be made to the detailed description of S203 in the embodiment shown in FIG. 2.

In this embodiment, the terminal device actively reports the HARQ process ID used for the sidelink data retransmission to the network device. When the network device allocates the retransmission resource to the terminal device, it can determine the target HARQ process ID. When the network needs to allocate the retransmission resource to the terminal, the HARQ process ID is carried in the retransmission scheduling information, so that the terminal can retransmit the sidelink data according to the target HARQ process ID.

Figure 6:
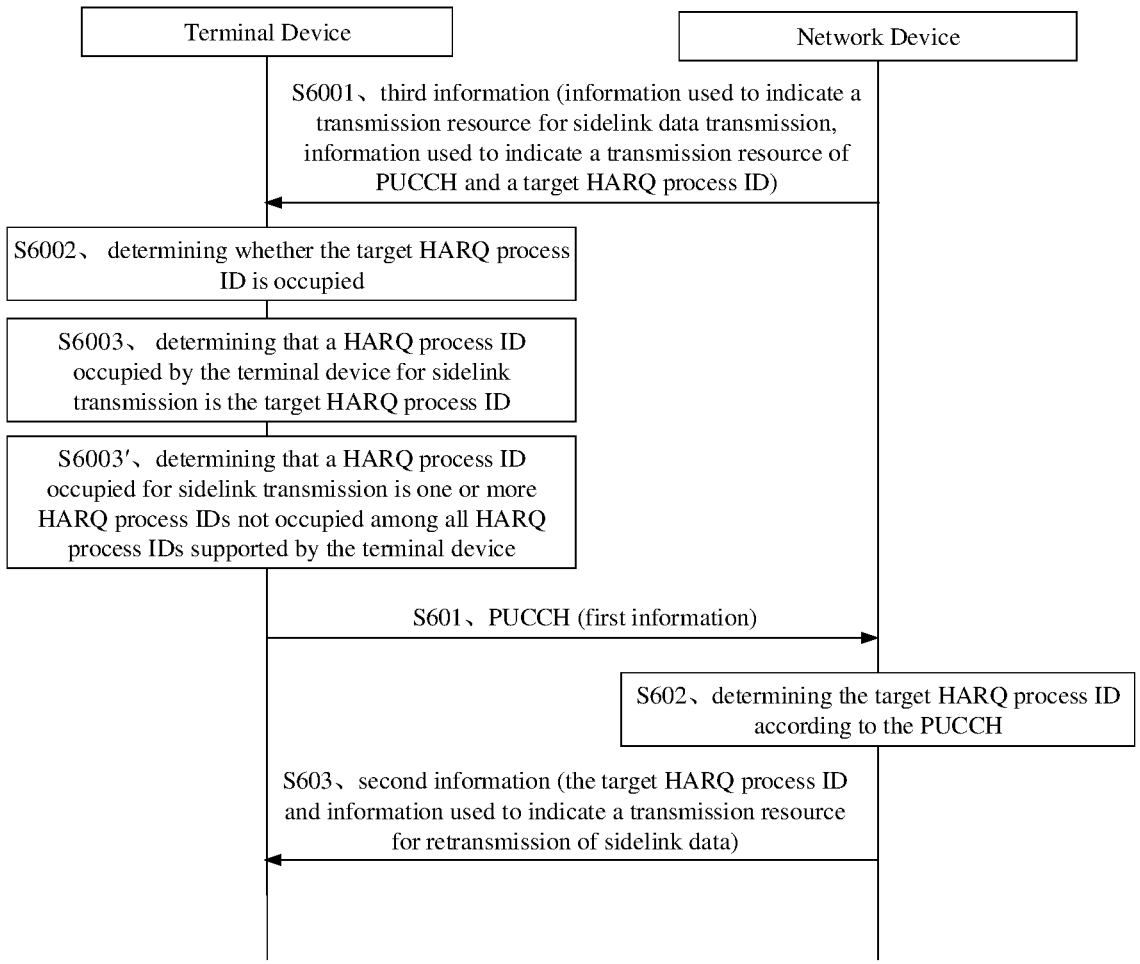
FIG. 6 is a flowchart of a fourth embodiment of a communication method according to the present disclosure.

FIG. 6 is a flowchart of a fourth embodiment of a communication method according to the present disclosure. As shown in FIG. 6, the method in this embodiment includes:

in S6001, the network device sends the third information to the terminal device.

In this step, in addition to the information used to indicate the transmission resource for the sidelink data transmission and the information used to indicate the PUCCH transmission resource for the feedback information reception, the third information sent by the network device to the terminal device may include the target HARQ process ID. When the network device configures the transmission resource for the sidelink data transmission and the PUCCH transmission resource for the feedback information reception for the terminal device, the correspondence between the PUCCH transmission resource and the target HARQ process ID is established.

In this step, the network device sends the third information to the terminal device through the RRC signaling and/or the DCI.

In S6002, the terminal device determines whether the target HARQ process ID is being used. If the terminal device determines that the target HARQ process ID is not being used, S6003 is executed, and if the terminal device determines that the target HARQ process ID is being used, S6003' is executed.

In S6003, the HARQ process ID used by the terminal device for sidelink transmission is determined as the target HARQ process ID.

In this scheme, the terminal device determines that the HARQ process ID used for the sidelink transmission is the target HARQ process ID. After that, the terminal device can perform the sidelink data transmission with other terminal devices according to the transmission resource for sidelink data transmission indicated in the third information, and the HARQ process ID corresponding to the sidelink transmission is the target HARQ process ID.

In S6003', the terminal device determines that the HARQ process ID used for sidelink transmission is one or more HARQ process IDs that are not being used among all the HARQ process IDs supported by the terminal device.

Specifically, if the target HARQ process ID is being used, the HARQ process ID used by the terminal device for sidelink transmission is one or more HARQ process IDs that are not being used among all the HARQ process IDs supported by the terminal device.

For example, the terminal device supports multiple HARQ processes, and the HARQ process IDs corresponding to the multiple HARQ processes are: HARQ ID1, HARQ ID2, HARQ ID3, HARQ ID4, HARQ ID5, HARQ ID6, HARQ ID7 and HARQ ID8, respectively. The target HARQ process ID included in the third information sent by the network device is HARQ ID1, and the terminal device determines that HARQ ID is used by another sidelink transmission. Among the 8 HARQ processes supported by the terminal device, the HARQ processes respectively corresponding to the HARQ process IDs of HARQ ID2, HARQ ID3 and HARQ ID4 are not being used, and the terminal device can determine that any one of the HARQ ID2, HARQ ID3, and HARQ ID4 is the HARQ process used by the terminal device to perform the sidelink transmission.

For example, the terminal device determines that HARQ ID2 is the HARQ process used by the terminal device to perform the sidelink transmission. That is, the terminal device establishes the correspondence between HARQ ID1 and HARQ ID2.

After that, the terminal device can perform the sidelink data transmission with other terminal devices according to the transmission resource for sidelink data transmission indicated in the third information, and the HARQ process ID corresponding to the sidelink transmission is HARQ ID2.

In S601, the terminal device sends the PUCCH to the network device.

This step is similar to S201 in the embodiment shown in FIG. 2 and will not be repeated here. For details, reference may be made to the detailed description of the S201 in FIG. 2.

In S602, the network device determines the target HARQ process ID according to the PUCCH.

In this step, when the network device sends the third information, the correspondence between the PUCCH transmission resource and the target HARQ process ID has been established. Therefore, when the network device receives the PUCCH, it can determine the target HARQ process ID according to the correspondence between the PUCCH and the target HARQ process ID in the third information.

In S603, the network device sends the second information to the terminal device.

As shown in the example in S6003, the network device can determine the target HARQ process ID according to the PUCCH, and send the target HARQ process ID to the terminal device, and the terminal device can determine the HARQ process ID corresponding to the retransmission scheduling according to the HARQ process ID in the second message.

As shown in the example in S6003', the network device can determine the target HARQ process ID as HARQ ID1 according to the PUCCH, and the second information sent by the network device to the terminal device includes HARQ ID1 and information used to indicate the transmission resource for the retransmission of the sidelink data.

Correspondingly, the terminal device receives the second information, and learns from HARQ ID1 in the second information and the correspondence between the HARQ ID1 and the HARQ ID2 that the retransmission scheduling is for the HARQ process corresponding to the HARQ ID2. After that, the terminal device may perform retransmission of the sidelink data according to the transmission resource for the sidelink data retransmission indicated by the network device, and the HARQ process ID corresponding to the sidelink transmission is HARQ ID2.

In this embodiment, if the network device allocates the HARQ process ID to the terminal device and the network device receives the PUCCH sent by the terminal device, the target HARQ process ID can be determined according to the correspondence between the allocated HARQ process ID and the PUCCH. The terminal device can perform the sidelink data retransmission according to the correspondence between the target HARQ process ID and the HARQ process ID actually used for the sidelink transmission as maintained by the terminal device.

Figure 7:
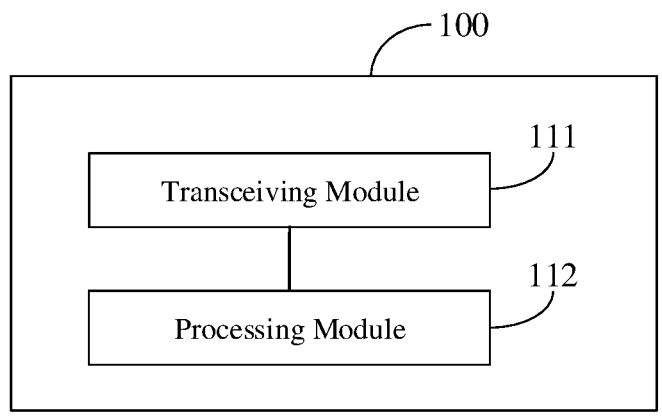
FIG. 7 is a schematic structural diagram of a first embodiment of a network device according to the present disclosure.

FIG. 7 is a schematic structural diagram of a first embodiment of a network device according to the present disclosure. Referring to FIG. 7, the network device 100 includes:

a transceiving module 111, configured to receive a PUCCH from a terminal device, where the PUCCH carries first information, and the first information is used to indicate reception status of sidelink data sent by the terminal device; and a processing module 112, configured to determine a target HARQ process ID according to the PUCCH.

The network device provided in this embodiment is configured to execute the technical solutions on the network device side in any of the foregoing method embodiments, and implementation principles and technical solutions thereof are similar, and thus will not be repeated here.

Based on the embodiment shown in FIG. 7, the transceiving module 111 is further configured to send third information to the terminal device, where the third information includes information used to indicate a transmission resource for sidelink data transmission and information used to indicate a transmission resource of the PUCCH.

In some possible designs, the processing module 112 is specifically configured to determine the target HARQ process ID according to the transmission resource of the PUCCH and a preset correspondence between transmission resources of multiple PUCCHs and HARQ process IDs.

In some possible designs, the preset correspondence between the transmission resources of the multiple PUCCHs and the HARQ process IDs includes: a preset correspondence between slots where the multiple PUCCHs are located and HARQ process IDs in a first preset HARQ process ID group; and the first preset HARQ process ID group includes HARQ process IDs used for sidelink transmission based on a configured grant sidelink transmission resource.

In some possible designs, the first preset HARQ process ID group includes K HARQ process ID sub-groups, and each HARQ process ID sub-group includes one or more HARQ process IDs; and the K HARQ process ID subgroups respectively correspond to K sidelink configured grant groups, and each sidelink configured grant group includes one or more transmission resources for the sidelink data transmission, where K is greater than or equal to 1.

In some possible designs, the transceiving module 111 is further configured to send a fourth message to the terminal device, and the fourth information includes the first preset HARQ process ID group and a second preset HARQ process ID group; and the second preset HARQ process ID group includes HARQ process IDs used for the sidelink transmission based on a transmission resource autonomously selected by the terminal.

In some possible designs, the multiple PUCCHs respectively use different transmission resources in the same transmission period, and the different transmission resources include different time domain resources, or different frequency domain resources, or different code domain resources.

In some possible designs, the third information includes indication information used to determine the multiple PUCCH transmission resources.

In some possible designs, the transceiving module 111 is further configured to send the preset correspondence between the multiple PUCCH transmission resources and the HARQ process IDs to the terminal device.

In some possible designs, the first information includes the target HARQ process ID; and the processing module 112 is specifically configured to determine the target HARQ process ID according to the first information carried in the PUCCH.

In some possible designs, the first information is generated according to information indicating the reception status of the sidelink data sent by the terminal device and the target HARQ process ID.

In some possible designs, the third information further includes the target HARQ process ID;

the processing module 112 is further configured to determine a correspondence between the target HARQ process ID and the transmission resource of the PUCCH according to the third information; and the processing module 112 is specifically configured to determine the target HARQ process ID according to the correspondence and the transmission resource of the PUCCH.

In some possible designs, the transceiving module 111 is specifically configured to send RRC signaling to the terminal device, and the RRC signaling includes the third information; or, the transceiving module 111 is specifically configured to send DCI to the terminal device, and the DCI includes the third information.

In some possible designs, the transceiving module 111 is further configured to send second information to the terminal device, and the second information includes the target HARQ process ID and indication information used to indicate a transmission resource for retransmission of the sidelink data.

Figure 8:
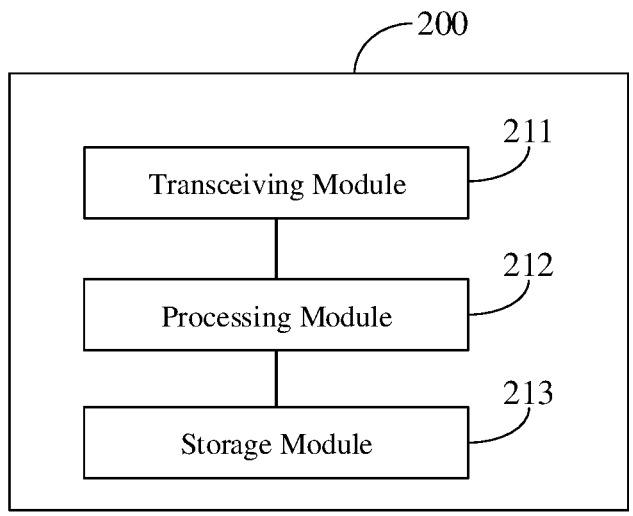
FIG. 8 is a schematic structural diagram of a first embodiment of a terminal device according to the present disclosure.

FIG. 8 is a schematic structural diagram of a first embodiment of a terminal device according to the present disclosure. As shown in FIG. 8, the terminal device 200 provided in this embodiment includes:

a transceiving module 211, configured to send a PUCCH to a network device, where the PUCCH carries first information, and the first information is used to indicate reception status of sidelink data sent by the terminal device; and the transceiving module 211 is further configured to receive second information sent by the network device, where the second information includes a target HARQ process ID and indication information used to indicate a transmission resource for retransmission of the sidelink data, and the target HARQ is determined according to the PUCCH.

The terminal device provided in this embodiment can be configured to execute the technical solutions on the terminal device side in any of the foregoing method embodiments, and the implementation principles and technical solutions thereof are similar, and thus will not be repeated here.

In some possible designs, before the transceiving module 211 sends the PUCCH to the network device, the transceiving module 211 is further configured to receive a third message sent by the network device, and the third message includes information used to indicate a transmission resource for sidelink data transmission and information used to indicate a transmission resource of the PUCCH.

In some possible designs, the target HARQ process ID is determined according to the transmission resource of the PUCCH and a preset correspondence between transmission resources of multiple PUCCHs and HARQ process IDs.

In some possible designs, the preset correspondence between the transmission resources of the multiple PUCCHs and the HARQ process IDs includes a preset correspondence between slots where the multiple PUCCHs are located and HARQ process IDs in a first preset HARQ process ID group; and the first preset HARQ process ID group includes HARQ process IDs used for sidelink transmission based on a configured grant sidelink transmission resource.

In some possible designs, the first preset HARQ process ID group includes K HARQ process ID subgroups, and each HARQ process ID subgroup includes one or more HARQ process IDs; and the K HARQ process ID subgroups respectively correspond to K sidelink configured grant groups, and each sidelink configured grant group includes one or more transmission resources for the sidelink data transmission, where K is greater than or equal to 1.

In some possible designs, the transceiving module 211 is further configured to receive a fourth message, and the fourth message includes the first preset HARQ process ID group and a second preset HARQ process ID group; and the second preset HARQ process ID group includes HARQ process IDs used for the sidelink transmission based on a transmission resource autonomously selected by the terminal.

In some possible designs, the multiple PUCCHs respectively use different transmission resources in the same transmission period, and the different transmission resources include different time domain resources, or different frequency domain resources, or different code domain resources.

In some possible designs, the third information includes indication information used to determine the transmission resources of the multiple PUCCHs.

In some possible designs, the transceiving module 211 is further configured to receive the preset correspondence between the multiple PUCCH transmission resources and the HARQ process IDs sent by the network device.

In some possible designs, the first information includes the target HARQ process ID; and the target HARQ process ID is determined according to the first information carried in the PUCCH.

In some possible designs, the first information is generated according to the reception status of the sidelink data sent by the terminal device and the target HARQ.

In some possible designs, the third information further includes the target HARQ process ID;

the terminal device further includes a processing module 212, further configured to determine whether the target HARQ process ID is used;

the processing module 212 is further configured to determine that a HARQ process ID used by the terminal device for the sidelink transmission is the target HARQ process ID if it is determined that the target HARQ process ID is not used; and the processing module 212 is further configured to determine that the HARQ process ID used by the terminal device for the sidelink transmission is one or more HARQ process IDs that are not used among all HARQ process IDs supported by the terminal device if it is determined that the target HARQ process ID is used.

The processing module 212 is further configured to determine a correspondence between the selected one or more HARQ process IDs and the target HARQ process ID.

In some possible designs, the terminal device may further include: a storage module 213, configured to store the correspondence between the selected one or more HARQ process IDs and the target HARQ process ID.

In some possible designs, the processing module 212 is further configured to determine a HARQ process ID for retransmission of the sidelink data by the terminal device according to the second information and the correspondence between the selected one or more HARQ process IDs and the target HARQ process ID.

In some possible designs, the transceiving module 211 is specifically configured to receive RRC signaling sent by the network device, and the RRC signaling includes the third information; or, the transceiving module 211 is specifically configured to receive DCI sent by the network device, and the DCI includes the third information.

Figure 9:
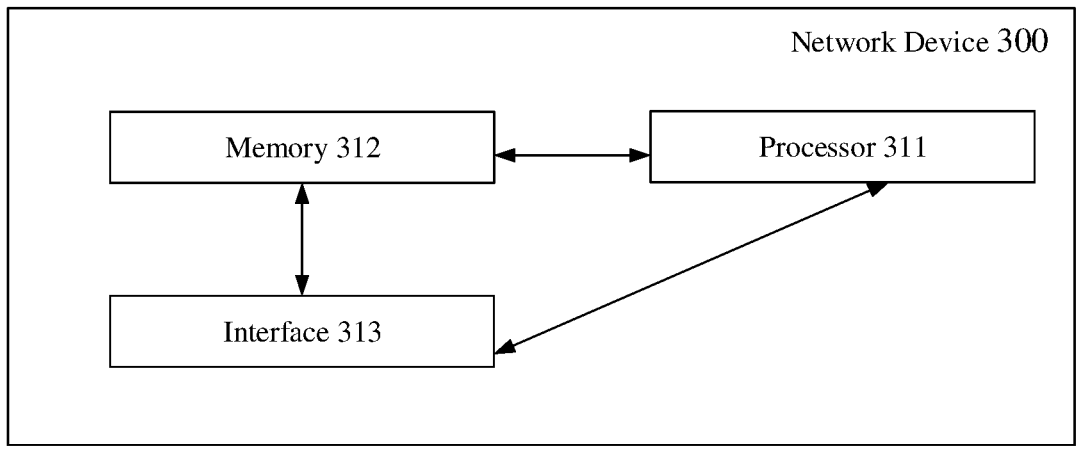
FIG. 9 is a schematic structural diagram of a second embodiment of a network device according to the present disclosure.

FIG. 9 is a schematic structural diagram of a second embodiment of a network device according to the present disclosure e. As shown in FIG. 9, the network device 300 includes: a processor 311, a memory 312 and an interface 313 for communication with the network device, the memory 312 stores computer-executable instructions; and the processor 311 executes the computer-executable instructions stored in the memory, to cause the processor 311 to perform the technical solution on the network device side according to any of the foregoing method embodiments.

FIG. 9 is a simple design of the network device, and the number of processors and memories in the network device is not limited in the embodiments of the present disclosure. FIG. 9 only takes the number of 1 as an example for illustration.

Figure 10:
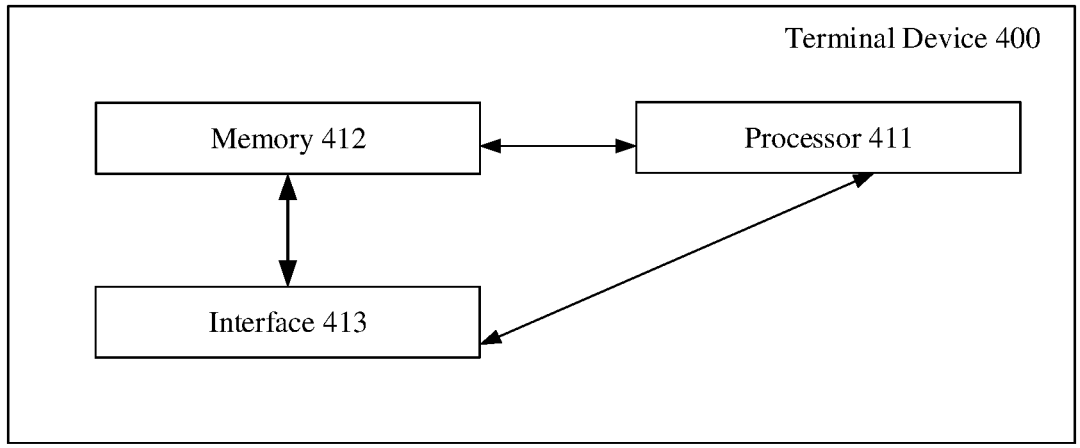
FIG. 10 is a schematic structural diagram of a second embodiment of a terminal device according to the present disclosure.

FIG. 10 is a schematic structural diagram of a second embodiment of a terminal device according to the present disclosure. As shown in FIG. 10, the terminal device 400 includes: a processor 411, a memory 412 and an interface 413 for communication with a network device;

the memory 412 stores computer-executable instructions; and the processor 411 executes the computer-executable instructions stored in the memory, to cause the processor 411 to perform the technical solution on the terminal device side according to any of the foregoing method embodiments.

FIG. 10 is a simple design of the terminal device, and the number of processors and memories in the terminal device is not limited in the embodiments of the present disclosure. FIG. 10 only takes the number of 1 as an example for illustration.

In a specific implementation of the network device shown in FIG. 9 and the terminal device described in FIG. 10, the memory, the processor, and the interface may be connected by a bus. Optionally, the memory may be integrated in the processor.

The embodiments of the present disclosure also provide a computer-readable storage medium, the computer-readable storage medium stores computer-executable instructions, and when the computer-executable instructions are executed by a processor, it causes to implement the technical solutions for the network device according to any of the foregoing method embodiments.

The embodiments of the present disclosure also provide a computer-readable storage medium. The computer-readable storage medium stores computer-executable instructions. When the computer-executable instructions are executed by a processor, it causes to implement the technical solutions for the terminal device according to any of the foregoing method embodiments.

The embodiments of the present disclosure also provide a program which, when being executed by a processor, is used to perform the technical solutions of the network device in any foregoing method embodiment.

The embodiments of the present disclosure also provide a program which, when being executed by a processor, is used to perform the technical solutions of the terminal device in any foregoing method embodiment.

Optionally, the foregoing processor may be a chip.

The embodiments of the present disclosure also provide a computer program product, including program instructions which are used to implement the technical solutions of the network device in any foregoing method embodiment.

The embodiments of the present disclosure also provide a computer program product, including program instructions which are used to implement the technical solutions of the terminal device in any foregoing method embodiment.

The embodiments of the present disclosure also provide a chip including a processing module and a communication interface, and the processing module can perform the technical solutions on the network device side in any foregoing method embodiment.

Further, the chip also includes a storage module (such as a memory), the storage module is configured to store instructions, the processing module is configured to execute the instructions stored in the storage module, and the execution of the instructions stored in the storage module causes the processing module to perform the technical solutions on the network device side in any foregoing method embodiment.

The embodiments of the present disclosure also provide a chip including a processing module and a communication interface, and the processing module can perform the technical solutions on the terminal device side in any foregoing method embodiment.

Further, the chip also includes a storage module (such as a memory), the storage module is configured to store instructions, the processing module is configured to execute the instructions stored in the storage module, and the execution of the instructions stored in the storage module causes the processing module to perform the technical solutions on the terminal device side in any foregoing method embodiment.

In the communication method and device, and the storage medium provided by the embodiments of the present disclosure, the terminal device sends the PUCCH to the network device, and the network device determines the target HARQ process ID according to a correlation between the PUCCH and the target HARQ process ID. When the network needs to allocate a retransmission resource for the terminal, the HARQ process ID is carried in retransmission scheduling information, so that the terminal can retransmit the sidelink data according to the target HARQ process ID.

It should be understood that the devices and methods disclosed in the embodiments provided in the present disclosure may be implemented in other ways.

For example, the device embodiments described above are merely illustrative.

For example, the division of the modules is only a kind of logical function division. In practice, there may be other division manners.

For example, multiple modules may be combined or integrated into another system, or some features may be ignored or not performed.

In addition, the illustrated or discussed mutual coupling or direct coupling or communication connection may be indirect coupling or communication connection through some interfaces and modules, and may be in electrical, mechanical or other forms.

In specific implementations of the aforementioned terminal device and network device, it should be understood that the processor may be a central processing unit (CPU), and the processor can also be other general purpose processors, digital signal processors (DSPs), application specific integrated circuits (ASICs) or the like. The general purpose processor may be a microprocessor, and the processor can also be any conventional processor, or the like. Steps of the method disclosed in the present disclosure may be directly embodied as being executed and completed by a hardware processor, or executed and completed by a combination of hardware and software modules in the processor.

All or part of the steps to implement the above various method embodiments may be completed by program instruction related hardware. The foregoing program may be stored in a readable storage medium. When the program is executed, the steps of the above various method embodiments are performed. The foregoing memory (storage medium) includes a read-only memory (ROM), a RAM, a flash memory, a hard disk, a solid state drive, a magnetic tape, a floppy disk, an optical disc and any combination thereof.

What is claimed is:

1. A method of communication, comprising:
    sending, by a terminal device, a physical uplink control channel (PUCCH) to a network device, wherein the PUCCH carries first information, and the first information is used to indicate reception status of sidelink data sent by the terminal device; and
    receiving, by the terminal device, third information sent by the network device, wherein the third information comprises information used to indicate a transmission resource for sidelink data transmission and information used to indicate a transmission resource of the PUCCH,
    wherein the PUCCH is used for determining a target hybrid automatic repeat request (HARQ) process identification (ID),
    wherein the target HARQ process ID is determined according to the transmission resource of the PUCCH and a preset correspondence between transmission resources of multiple PUCCHs and HARQ process IDs,
    the preset correspondence between the transmission resources of the multiple PUCCHs and the HARQ process IDs comprises: a preset correspondence between slots where the multiple PUCCHs are located and HARQ process IDs in a first preset HARQ process ID group; and
    the first preset HARQ process ID group comprises HARQ process IDs used for sidelink transmission based on a configured grant sidelink transmission resource.

2. The method according to claim 1, wherein the first preset HARQ process ID group comprises K HARQ process ID subgroups, and each HARQ process ID subgroup comprises one or more HARQ process IDs; and
    the K HARQ process ID subgroups respectively correspond to K sidelink configured grant groups, and each sidelink configured grant group comprises one or more transmission resources for the sidelink data transmission, where K is greater than or equal to 1.

3. The method according to claim 1, wherein the third information further comprises the target HARQ process ID;
    the third information is further used for determining a correspondence between the target HARQ process ID and the transmission resource of the PUCCH; and
    the target HARQ process ID is determined according to the correspondence and the transmission resource of the PUCCH.

4. The method according to claim 1, wherein the receiving, by the terminal device, the third information sent by the network device comprises:
    receiving, by the terminal device, radio resource control (RRC) signaling sent by the network device, wherein the RRC signaling comprises the third information; or
    receiving, by the terminal device, downlink control information (DCI) sent by the network device, wherein the DCI comprises the third information.

5. The method according to claim 1, wherein the method further comprises: receiving, by the terminal device, second information sent by the network device, wherein the second information comprises the target HARQ process ID and indication information used to indicate a transmission resource for retransmission of the sidelink data.

6. The method according to claim 1, wherein the target HARQ process ID is determined according to a period where the PUCCH is located and a correspondence between the period where the PUCCH is located and the HARQ process ID.

7. The method according to claim 1, wherein in a case where sidelink feedback information carried in the PUCCH is NACK, retransmission resources are allocated for the terminal device by the network device in a dynamic scheduling manner, the target HARQ process ID and information of the retransmission resources are included in retransmission scheduling information, and the method further comprises:
    determining, by the terminal device, the period of sidelink transmission corresponding to the retransmission scheduling according to the target HARQ process ID in the retransmission scheduling information, and
    retransmitting, by the terminal device, the sidelink data corresponding to the HARQ process ID on the retransmission resources.

8. The method according to claim 1, wherein the target HARQ process ID is used for determining a HARQ process ID used for sidelink transmission.

9. A network device, comprising:
    a transceiver;
    a processor; and
    a memory configured to store a computer program executable by the processor,
    wherein the transceiver is configured to receive a physical uplink control channel (PUCCH) from a terminal device, wherein the PUCCH carries first information, and the first information is used to indicate reception status of sidelink data sent by the terminal device;
    wherein the transceiver is further configured to send third information to the terminal device, wherein the third information comprises information used to indicate a transmission resource for sidelink data transmission and information used to indicate a transmission resource of the PUCCH,
    wherein the PUCCH is used for determining a target hybrid automatic repeat request (HARQ) process identification (ID),
    wherein the target HARQ process ID is determined according to the transmission resource of the PUCCH and a preset correspondence between transmission resources of multiple PUCCHs and HARQ process IDs,
    the preset correspondence between the transmission resources of the multiple PUCCHs and the HARQ process IDs comprises: a preset correspondence between slots where the multiple PUCCHs are located and HARQ process IDs in a first preset HARQ process ID group; and the first preset HARQ process ID group comprises HARQ process IDs used for sidelink transmission based on a configured grant sidelink transmission resource.

10. A terminal device, comprising:

a transceiver;

a processor; and a memory configured to store a computer program executable by the processor, wherein the transceiver is configured to send a physical uplink control channel (PUCCH) to a network device, wherein the PUCCH carries first information, and the first information is used to indicate reception status of sidelink data sent by the terminal device;

wherein the transceiver is further configured to receive third information sent by the network device, wherein the third information comprises information used to indicate a transmission resource for sidelink data transmission and information used to indicate a transmission resource of the PUCCH, wherein the PUCCH is used for determining a target HARQ process ID, wherein the target HARQ process ID is determined according to the transmission resource of the PUCCH and a preset correspondence between transmission resources of multiple PUCCHs and HARQ process IDs, the preset correspondence between the transmission resources of the multiple PUCCHs and the HARQ process IDs comprises: a preset correspondence between slots where the multiple PUCCHs are located and HARQ process IDs in a first preset HARQ process ID group; and the first preset HARQ process ID group comprises HARQ process IDs used for sidelink transmission based on a configured grant sidelink transmission resource.

11. The terminal device according to claim 10, wherein the target HARQ process ID is determined according to a period where the PUCCH is located and a correspondence between the period where the PUCCH is located and the HARQ process ID.

12. The terminal device according to claim 10, wherein in a case where sidelink feedback information carried in the PUCCH is NACK, retransmission resources are allocated for the terminal device by the network device in a dynamic scheduling manner, the target HARQ process ID and information of the retransmission resources are included in retransmission scheduling information, and the processor is configured to determine the period of sidelink transmission corresponding to the retransmission scheduling according to the target HARQ process ID in the retransmission scheduling information, and the transceiver is configured to retransmit the sidelink data corresponding to the HARQ process ID on the retransmission resources.

13. The terminal device according to claim 10, wherein the target HARQ process ID is used for determining a HARQ process ID used for sidelink transmission.

* * * * *